C. DE W. WAGNER.
SHEET METAL SHEARS.
APPLICATION FILED JULY 3, 1920.
1,410,972.
Patented Mar. 28, 1922.
2 SHEETS—SHEET 2.
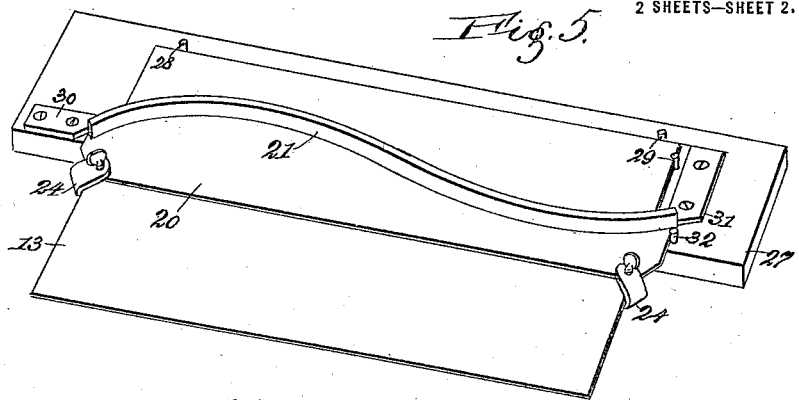
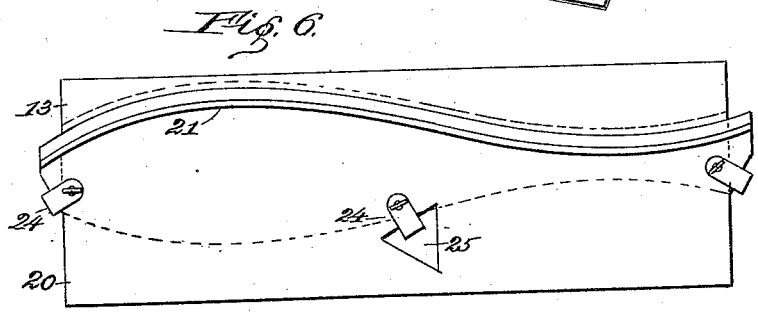
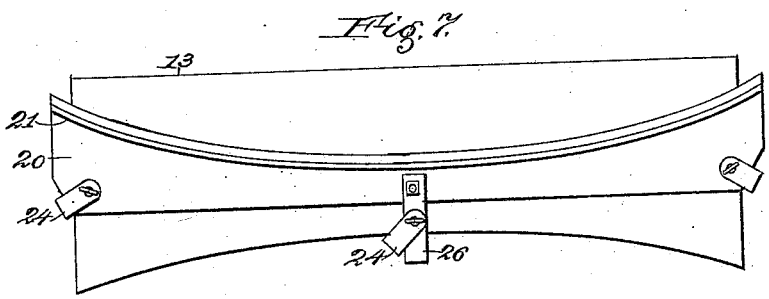
Inventor
Clinton DeWitt Wagner
By J. M. St. John
Atty.

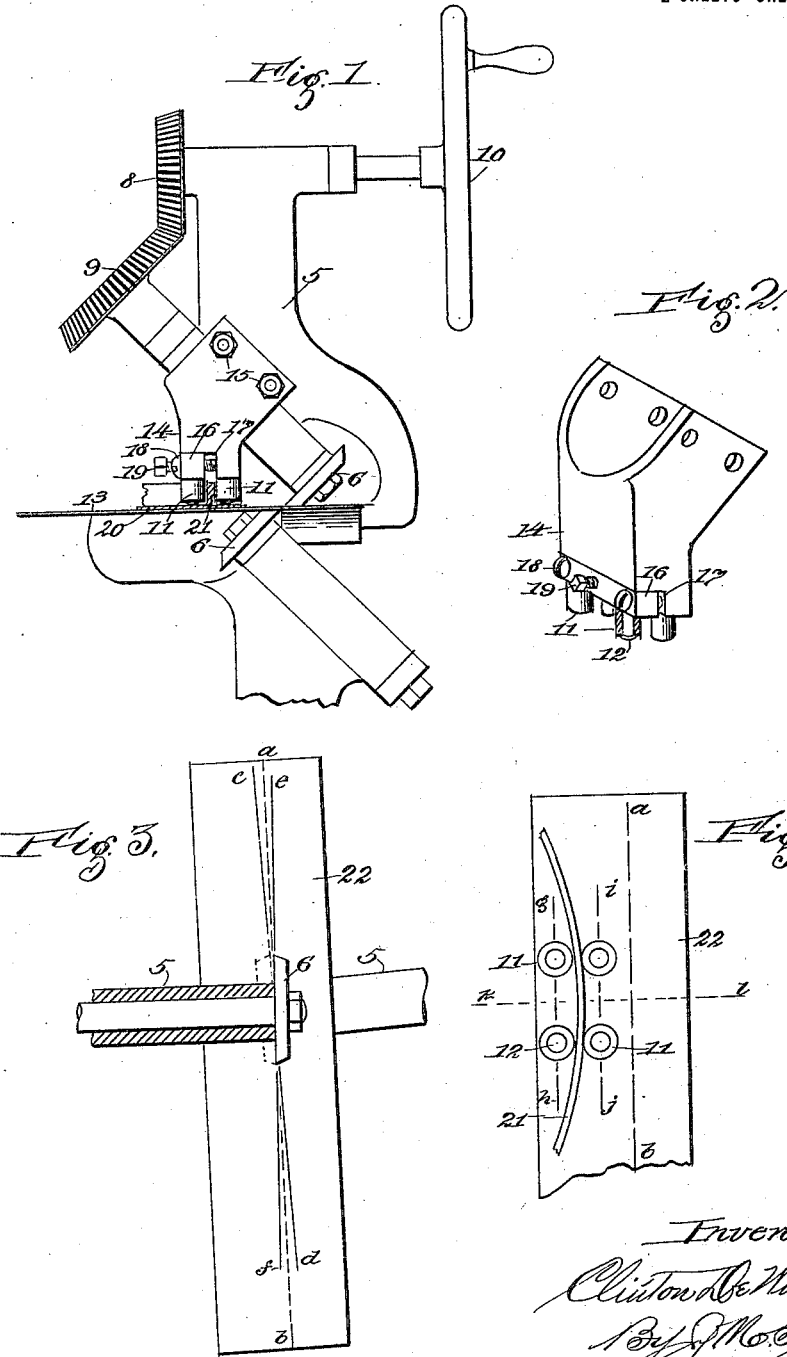

UNITED STATES PATENT OFFICE.

CLINTON DE WITT WAGNER, OF CEDAR RAPIDS, IOWA.

SHEET-METAL SHEARS.

1,410,972.  Specification of Letters Patent.  Patented Mar. 28, 1922.

Application filed July 3, 1920. Serial No. 393,837.

*To all whom it may concern:*

Be it known that I, CLINTON DE WITT WAGNER, a citizen of the United States, residing at Cedar Rapids, in the county of Linn and State of Iowa, have invented certain new and useful Improvements in Sheet-Metal Shears, of which the following is a specification.

This invention relates to the shearing of sheet metal by means of rotary cutters, and the object of the invention is to provide means for shearing such metal true to form by a purely mechanical operation.

The invention embodies certain improvements in the art of shearing sheet metal, for which Letters Patent numbered 801,697 and 935,072 were issued to me October 10, 1905, and September 28, 1909, respectively. Said patents relate to throatless shears for cutting comparatively thin metal, the shear being manually pushed or pulled across the sheet. In this case it is possible to place the rollers which co-operate with the shear guide in a position perpendicular to the sheet and with the guide-track practically in the cutting line. In the present invention provision is made for the shearing of much heavier stock by means of stationary shears, to which considerable power must be applied. The construction of such shears makes it necessary to arrange any guiding apparatus lateral to the cutters, and this has presented certain difficulties which, so far as I am aware, have not been solved heretofore.

The invention is fully set forth and claimed in the specifications following, reference being had to the accompanying drawings, in which:—

Fig. 1 is a side elevation of a hand-operated, throatless shear, with my shearing guide attached. Fig. 2 shows in perspective the guide rollers and a mounting block therefor attachable to the shear body. Fig. 3 illustrates the method by which I determine the proper setting of the guide rollers. Fig. 4 shows diagrammatically the proper setting of the rollers, and the relation of a curved guide-track thereto. Fig. 5 shows a typical guide-track or template, and a simple manner of locating the same on a sheet and attaching it thereto. Fig. 6 is a plan view of a template, illustrating the fastening of a sheet thereto in the middle. Fig. 7 shows another way of so fastening the template to the sheet.

In the drawing, the numeral 5 denotes a bench shear, of the rotary cutter, throatless type, and now in common use. The cutters 6 are mounted on diagonal arbors, and one of the arbors is driven by gears 8 and 9 and a hand-wheel 10. In practice one of the cutters is serrated, thus dispensing with gears to connect the arbors, but this forms no part of the present invention. It is to be noted, however, that in order to give a shearing action to the cutters, the arbors are skewed a little in relation to each other, as shown in Fig. 3. The shear is adapted for the cutting of much heavier stock than is commonly employed in furnace and the like tinsmith work, but hitherto no means have been provided for guiding the sheet, except by the hand and eye, following a scratched line. This is both slow, and inaccurate, whereas for duplicate work both speed and accuracy are demanded. This I accomplish by means of templates clamped to the parent sheet, which template co-operates with guide-rollers, as will now be described.

Laterally adjacent to the cutters, and preferably as near to them as is practicable, is mounted a set of four rollers 11, with their axes 12 practically perpendicular to the parent sheet 13 as it is cut. A simple mount for the rollers is shown in Figs. 1 and 2, and comprises a stirrup-block 14 which is bolted to the shear body at 15. One pair of rollers is mounted by its axes permanently on the block. The other pair should be mounted adjustably thereto. A simple device is shown the same being a short bar 16, to which the roller-studs or axes are attached, and located in a recess 17 in the block, where it is held adjustably by means of tension-screws 18 and a set-screw 19. By this means the spacing between the pairs of rollers may be adjusted nicely to the working requirements, and more loosely with respect to the guide-rib of the template as its curvature increases. The template itself is a plate of sheet metal 20 provided with an upstanding rib 21, to run between the pairs of rollers, and so guide the parent sheet in its proper course while being cut. The true shape of this guide-rib with respect to the form to be cut will be described presently.

The proper setting of the rollers in relation to the shearing cutters is a matter of great nicety, since any deviation from the exact position will cause the cutters to "crawl," running in or out from their proper course, as the case may be. When heavy stock is being cut, this crawl of the shears not only spoils the work, but may break or bend the guiding apparatus, or even break the cutters themselves. Once the rollers are properly set, however, all this adverse tendency of the cutters is eliminated, and the shearing, either in straight lines, or moderate curves, is perfectly smooth and clean.

My experience tends to show that this cannot be done theoretically, but must be determined experimentally. The skew of the cutter arbors; the size of the cutters; their lap in cutting, and other factors so complicate the problem that it is practically impossible to solve it geometrically. The experimental test is very simple, however, and is indicated in Figs. 3 and 4. On a test-plate 22 is scratched a perfectly straight line $a\ b$. This should, for convenience, be exactly parallel with one of the sides of the plate. With the plate held lightly in one hand, the operator now passes it through the shear, guiding it sufficiently for the shear to follow naturally, and with no inclination to swerve to either side, the scratched line, which thus becomes the line of least deflection. This line, as indicated in Fig. 3, will approximate a bisection of the angle of the cutters to each other, shown by the lines $c\ d$ and $e\ f$. With the test-plate in this neutral position, the guide rollers are set as indicated in Fig. 4, the longitudinal rollers exactly parallel with the scratched line in its relation to the cutters, and the transverse pairs of rollers equidistant from the cutting point of the cutters, these lines being $g\ h$, $i\ j$, and $k\ l$ respectively. The guide-rollers being thus fitted accurately to the shear, it may be depended upon for satisfactory work indefinitely.

The rollers being spaced away laterally from the cutting line, it is evident the curve of the template guide-rib will vary from that of the line as cut. Accordingly allowance must be made for this difference in forming the guide-rib. A simple method is to cut a pattern accurately along a line, guiding the sheet by hand. Then form the guide-rib to a line parallel with the cut outline, and spaced away therefrom to correspond with the space between said rib and the cutters when in use. The edge of the template is trimmed away a little, after the guide-rib is attached, which may be by soldering.

It will be seen by reference to Fig. 5 that the template is made a little longer than the width of the parent sheet, so as to seat the guide-rib between the rolls in starting and finishing the cut. The template is conveniently attached to the parent sheet by clamps 24. In the case of a piece of work that is long and slender it is sometimes desirable to clamp it in the middle, as well as at the ends. This may be done by providing a wide template, as in Fig. 6, with a hole at 25 to receive the clamp, or by attaching an extension 26, as shown in Fig. 7. This additional clamping effectually prevents any buckling in the case mentioned above.

In Fig. 5 is also shown a convenient gauge for setting the template on the parent sheet, for the saving of time in duplicate work. A guide-board 27 is provided with stop-pins 28 and 29 to locate the parent sheet, and with stops 30, 31 and 32 to engage the template as laid on said parent sheet in position for clamping thereto. By these means duplicate forms of sheet metal may be produced very rapidly, and with a high degree of accuracy.

Having thus described my invention, I claim:

1. The described method of and means for producing duplicate sheet-metal forms with rotary shears, which comprises a template provided with an upstanding guide-rib, guide-rollers with parallel axes to straddle said guide-rib, and a parent sheet secured to said template, the rollers being located laterally of the cutting line, and parallel to the line of least deflection in making the cut.

2. A cutting guide for rotary sheet-metal shears, comprising two pairs of rollers, set laterally with respect to the line of cut, and a ribbed template co-operating with said rollers, and secured to the sheet to be cut, the longitudinal pairs of rollers being set parallel with the ascertained line of least tendency to lateral deflection in cutting, and the transverse pairs being equidistant from a line perpendicular thereto intersecting the cutting point.

3. A cutting guide for rotary shears, comprising a ribbed template attachable to the sheet to be cut, a double pair of rollers to straddle said rib, a fixed mount or support for one pair of the rollers, to hold them lateral to and parallel with the ascertained cutting line of least deflection, and a laterally adjustable support for the other pair of rollers attached to the first mentioned support.

In testimony whereof I affix my signature in presence of two witnesses.

CLINTON DE WITT WAGNER.

Witnesses:
R. D. BROWN,
J. M. ST. JOHN.